United States Patent [19]

Giehl

[11] Patent Number: 4,694,854

[45] Date of Patent: Sep. 22, 1987

[54] DEVICE FOR REGULATING THE DISCHARGE OF FLUID FROM A CONTAINER

[75] Inventor: Klaus U. Giehl, Heimborn, Fed. Rep. of Germany

[73] Assignee: Lothar Steinhardt, Fed. Rep. of Germany

[21] Appl. No.: 744,068

[22] PCT Filed: Oct. 25, 1984

[86] PCT No.: PCT/DE84/00221

§ 371 Date: Jun. 6, 1985

§ 102(e) Date: Jun. 6, 1985

[87] PCT Pub. No.: WO85/01974

PCT Pub. Date: May 9, 1985

[30] Foreign Application Priority Data

Oct. 26, 1983 [DE] Fed. Rep. of Germany ....... 3338793
Sep. 27, 1984 [DE] Fed. Rep. of Germany ....... 3435450

[51] Int. Cl.⁴ .............................................. F16K 17/12
[52] U.S. Cl. .................................... 137/519; 137/521; 137/527.8
[58] Field of Search ............. 137/499, 519, 521, 527.8

[56] References Cited

U.S. PATENT DOCUMENTS

| 876,066 | 1/1908 | Klever | 137/521 |
|---|---|---|---|
| 2,646,060 | 2/1953 | Ponsar | 137/501 |
| 3,242,943 | 3/1966 | Waterfill | 137/521 |
| 4,088,150 | 5/1978 | Serratto | 137/521 |
| 4,289,161 | 9/1981 | Siegwart | 137/521 |
| 4,351,359 | 9/1982 | Scherwarth | 137/521 |

FOREIGN PATENT DOCUMENTS

| 438667 | 12/1926 | Fed. Rep. of Germany . |
| 1688276 | 12/1954 | Fed. Rep. of Germany . |
| 2523942 | 12/1976 | Fed. Rep. of Germany . |
| 2845086 | 10/1978 | Fed. Rep. of Germany . |
| 3038098 | 10/1980 | Fed. Rep. of Germany . |
| 384230 | 1/1961 | Switzerland . |
| 484617 | 6/1938 | United Kingdom . |

Primary Examiner—A. Michael Chambers
Assistant Examiner—John C. Fox
Attorney, Agent, or Firm—Barnes & Thornburg

[57] ABSTRACT

A throttling unit (1) is joined with a pressure detector by a regulating device for controlling the discharge of a fluid from a container. The regulating device has a throttling unit (3) that is designed to pivot on an axis in a manner permitting regulated closure across the diameter of the run-of opening (2'). The throttling unit is joined in a manner permitting operative movement with a pressure detector (9), which, in dependence upon water pressure, governs the movement of the throttling unit in the closure diameter of the run-off opening. The regulating device is set in a throttling chamber (21), which details on one side an output control area (10) open to the atmosphere and a run-off area (2). Because of the compactness of structure of the throttling unit and the pressure detector, the space required for the regulating device is extremely small.

15 Claims, 7 Drawing Figures

DEVICE FOR REGULATING THE DISCHARGE OF FLUID FROM A CONTAINER

The present invention relates to a regulating device for controlling the flow of a fluid from a run-off opening of a container. The regulator entails a throttling unit that is designed to pivot on an axis and in this manner control the diameter of the closure of the run-off opening.

An object of the present invention is to construct a regulating device distinguished both by compactness of construction and minimum maintenance.

This object is achieved with a regulating device in which a throttling unit is united operatively with a pressure detector that governs said throttling unit in the closure of the diameter of said run-off opening.

The throttling member can also be rigidly united with the pressure detector.

Preferably the regulating device is set in a throttling chamber that consists of an output control area, which is open on one side to the atmosphere, and of a run-off area. The throttling unit united rigidly with the pressure detector together form a compact structural unit. The pressure detector is united with said throttling unit at such an angle that, with any position of the throttling unit, the pressure detector maintains a seal with its outer contour along an inner contour of the output control area corresponding to it.

Regulating devices of this type are commonly used where, in spite of varying in-flow volume, the volume of discharge from a container is desired to be controlled. Thus, the present invention is intended not just for rain retention basins, but, for example, for dairies and breweries.

The present invention is a regulating device distinguished by minimum space requirements, few moving and/or nonmoving parts, relatively low production costs and high reliability of operation. Because of little need for space, the invention can be used in relatively small rain water retention basins or similar containers. For example, it can be built into an existing basin or container enclosed in a housing. In addition, one feature of the structural design and the anticipated location of installation--in the area at the bottom of the container--is that the invention is not susceptible to deposits of debris.

The pressure detector, which functions as the control element for the throttling unit, as well as the throttling unit itself, can have various construction designs.

Preferred designs of the invention are the subject of the subclaims.

The pressure detector can be fastened to a rocking shaft running perpendicular to the run-off direction. The rocking shaft activates the throttling flap. In this case, the hydrostatic water pressure works against the pressure detector on one side and against the throttling flap on the other.

With another arrangement of the device, the pressure detector can be fastened to a rocking shaft running parallel to the run-off direction, in which case a throttling plate is installed, that is guided operatively, perpendicular to the run-off opening on one and/or the other end of the rocking shaft. This design permits the invention to be set up in a recess of the basin wall, for example.

A further design appropriate for the recommendation of claim 6 is possible, in which the pressure detector has the shape of a piston that is extended lengthwise in an area controlling the range of output which is appropriate for its diameter. The piston acts upon a corresponding throttling plate by way of a suitable transfer of force, for example, a linkage gear. The compensating unit that reacts counter to the water pressure is preferably designed as a moveable counterweight, commonly known for this purpose, so that the pressure detector, as given in claim 7, is weighted with a moveable counterweight. Along with this, the compensating unit can also entail an appropriate mechanical and/or hyropneumatic spring with given, individual, and, if necessary, adjustable characteristics.

As in claim 9, the invention includes a throttling flap which can be designed as a hollow body. With this structure, the throttling flap's wall facing the pressure detector is larger in surface area than the regulating surface of the throttling flap and/or at least equal to or greater than the pressure bearing surface of the pressure detector. The throttling flap's wall facing the run-off opening then is placed forward of the run-in channel of the hollow body, and with this a drain opening is then made at a spot directly opposite the entry opening of said run-in channel of said hollow body.

This arrangement has the advantage that, if the residual opening of the run-off opening is blocked, the hollow body fills with water, so that the equilibrium factors of the regulating system are changed and the throttling flap opens by itself, causing an automatic removal of the blockage.

Additionally, as in claim 10 of the device, the pressure detector can have the form of a section of hollow cylinder. With this, it is possible to install a seal that surrounds the opening towards the atmosphere on the output control area wall, by which production and maintenance is simplified.

In an additional design the throttling chamber has a hollow chamber placed after the output control area in the direction of flow. The hollow chamber is closed off from the output control area by the pressure detector in the flow direction by a wall set perpendicular to the run-off direction, and from the run-off area by a wall set directly horizontal at the height of the rocking shaft. The horizontal wall is joined with the perpendicular wall and said rocking shaft, and results in said drain opening. The pressure detector designed as a section of hollow cylinder is open to the hollow chamber. The run-in channel to said section of hollow cylinder is placed to the front of said throttling flap in a direction contrary to flow.

The invention will be explained in further detail with four examples of design in conjunction with FIGS. 1 through 7.

Figure 1:
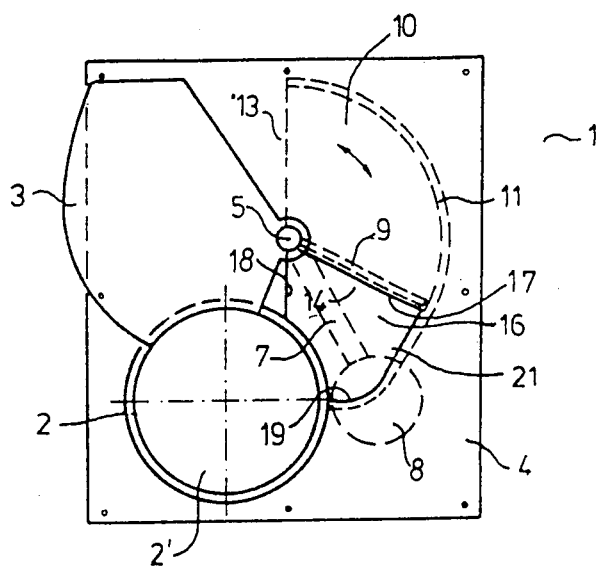
FIG. 1 is a diagrammatic view from the front of one design of a regulating device according to the present invention.

The illustrations in FIGS. 3 through 6 show a preferred design of the invention. The regulating device 20 entails a throttling chamber 21, which comprises an output control area 30 in its upper region and a run-off control area 30' with its run-off opening 26 in the lower region. The regulating device is attached in a discharge opening 22 of a container 23 to this container. At the further end from the container 23 of the throttling chamber 21 is situated a throttling flap 24 attached to a rocking shaft 25. The throttling flap 24 thoroughly closes the discharge opening 22 of the throttling chamber 26, except for a residual opening, as in the position shown in FIGS. 3 and 4.

A rocking shaft 25 is seated, so as to pivot, in side walls 27 and 28 of the throttling chamber 21 and runs parallel to the plane of throttling flap 24. A pressure detector 29 is rigidly fastened to the rocking shaft 25. The pressure detector 29 is seated to pivot within a given field of traverse in the upper region of the throttling chamber 21, which is the output control area labelled 30. The output control area 30 is closed off by wall parts of the sidewise walls 27 and 28, as well as by a contoured wall 31.

Counterweights 32 and 33 are fastened on both ends of the rocking shaft 25.

With the design shown in FIGS. 3 through 6, the throttling flap 24 is further refined by a chamber 35 enclosed except for one opening 34 with a run-in channel 36 located forward. The chamber 35 is formed with additional walls 37 and 38 in conjunction with the throttling flap 24; the run-in channel 36 is formed with a section cut from the throttling flap 24 and with an additional wall 39.

The regulating device as shown in FIGS. 3 through 6 functions as follows.

Figure 3:
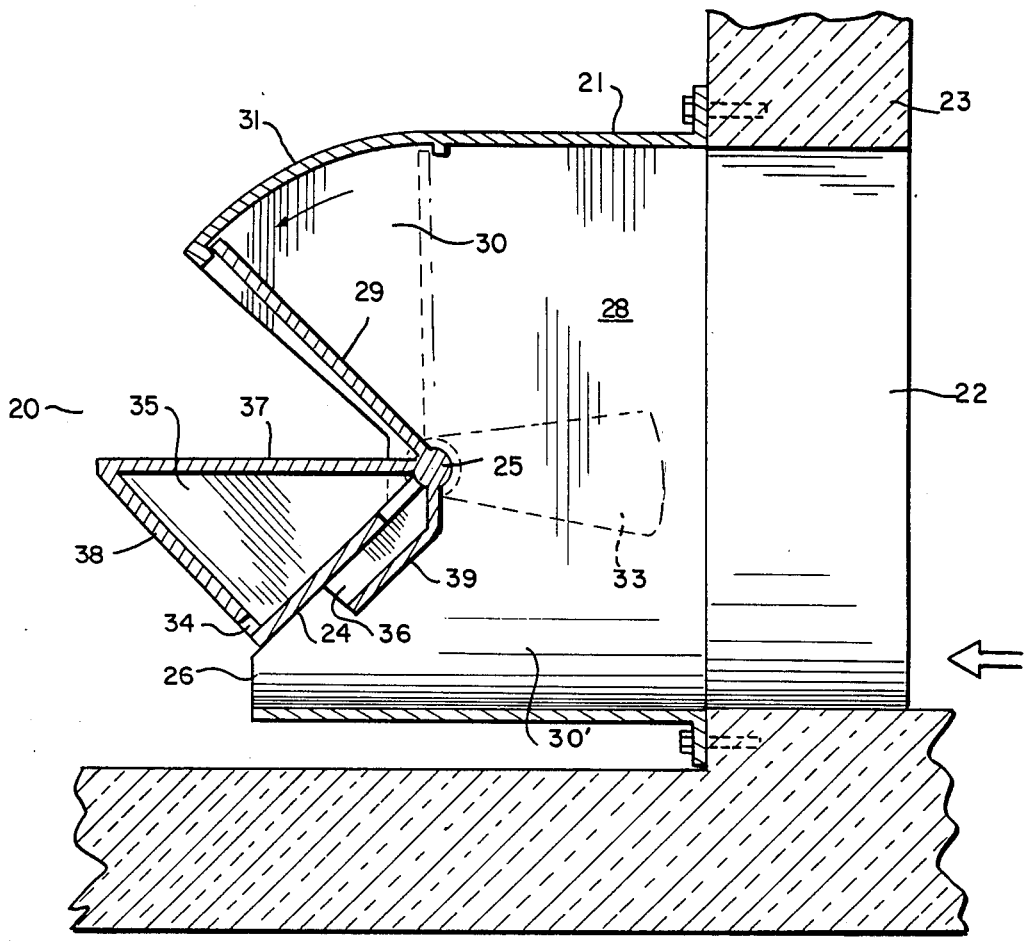
FIG. 3 is a diagrammatic view from the side of a different design of the invention taken in a cross section corresponding to line A—A in FIG. 4.
Figure 4:
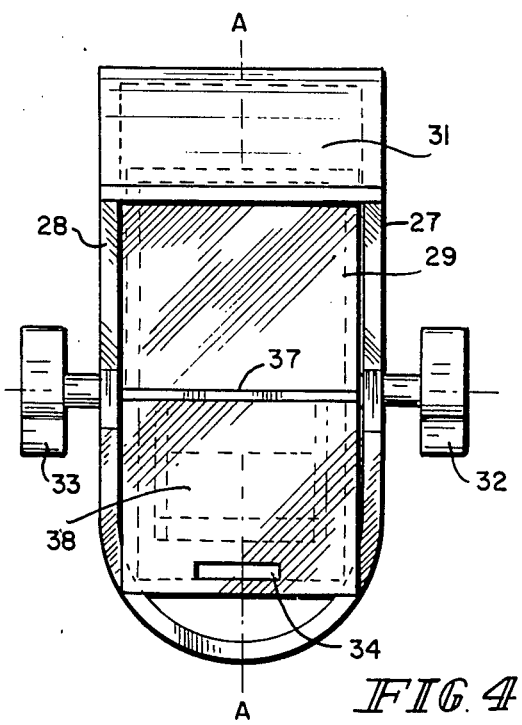
FIG. 4 shows the device of FIG. 3 in a frontal, top view.
Figure 5:
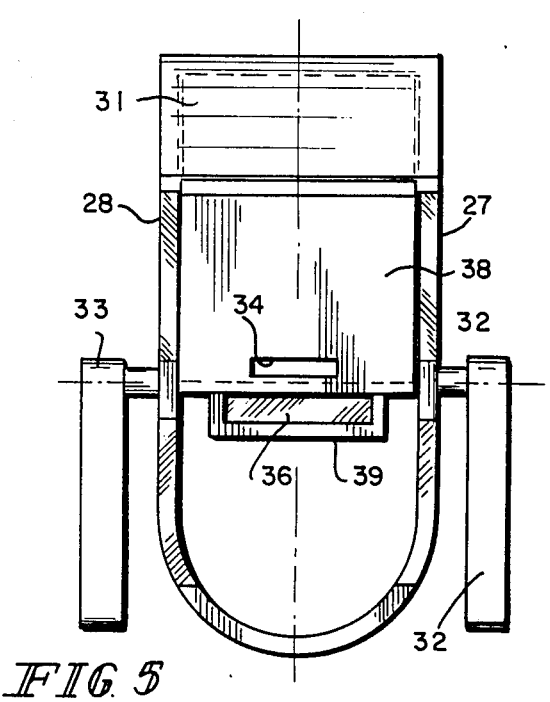
FIG. 5 shows the device of FIG. 3, likewise in a frontal, top view and with the position of the throttling flap of the device deflecting from the position of the throttling flap in the case shown in FIG. 4.
Figure 6:
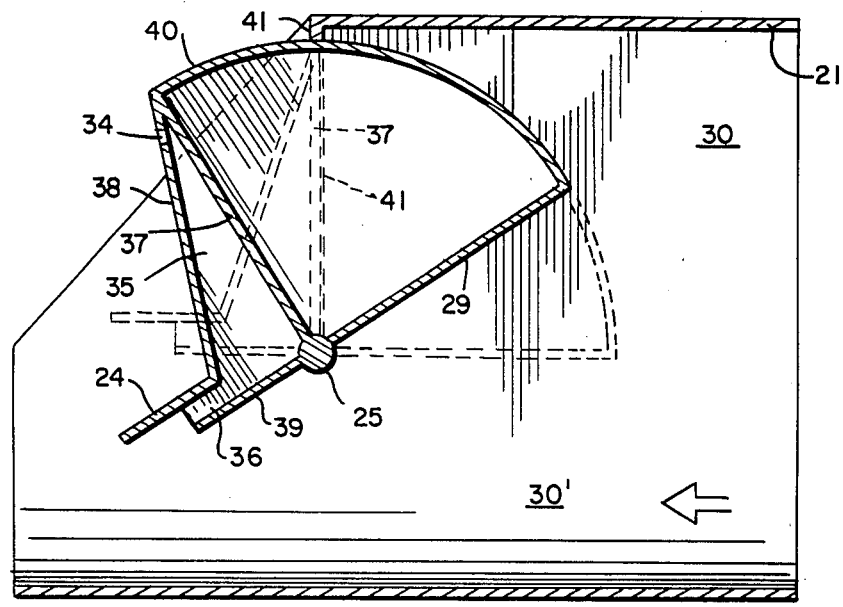
FIG. 6 shows a side view of a cross section analogous to FIG. 3, but of a different design of the pressure detector of the present invention.
Figure 7:
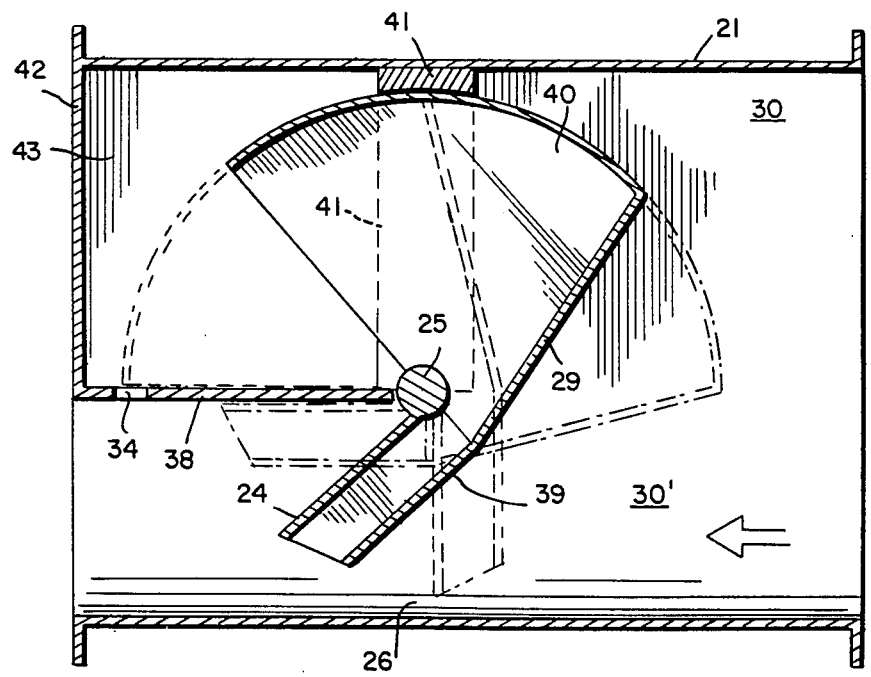
FIG. 7 shows yet an additional design of the invention in a side view analogous to FIGS. 3 and 6.

As the water level rises and/or water pressure in the container 23 increases, the pressure detector 29 is moved from the position indicated in phantom in FIG. 3 in the direction of the arrow, more or less corresponding to the fluid pressure over against the effect of the counterweights 32 and 33. Because of this, the throttling flap 24 is moved towards the discharge opening 26 and closes the same by increasing degree until equilibrium between the opposed forces is reestablished, namely: the water pressure against the pressure detector 29 and the water pressure against the throttling flap 24 linked with the counterweights 32 and 33. The intended refinement of design in FIGS. 3 through 6 provided by the chamber 35 with run-in channel 36 functions in that the regulating device automatically removes a blockage from the flow, in the event that the residual opening of the run-off opening 26 is blocked, which is always a possibility.

The water stream from the discharge opening 26 creates a suction that prevents entry of water through the run-in channel 36 into the chamber 35.

If there is a blockage of the discharge opening 26, the suction of the water stream stops, whereupon water penetrates through the run-in channel 36 into the chamber 35 due to static water pressure. Because the surface of wall 37 is greater than that of the throttling flap 24, greater pressure than before is created upon the pressure detector 29 through the rocking shaft 25 corresponding to the prevailing static pressure.

The original equilibrium is changed by this greater pressure whereupon the throttling flap 24 enlarges the discharage opening 26 again and thus frees the blockage.

After freeing and/or removal of the blockage the original equilibrium at the discharge opening 26 is regained; the suction of the water stream prevents water from penetrating into the chamber 35, and chamber 35 empties through opening 34. Automatic regulation now functions again as before.

Drawing 7 shows a departure from the design described thus far. Here the pressure detector 29 entails a hollow cylinder section 40. In contrast with the design described above, the hollow cylinder section 40 is open toward an additional hollow chamber 43. The hollow chamber 43 is located to the front of the output control area 30 and is separated from it by the pressure detector 29. Other boundaries of said hollow chamber 43 are formed by the vertical wall 42 and the wall 38 set horizontally at the height of the rocking shaft 25. Said latter wall has an opening 34. The wall 38 is placed so that it serves as the stop for the hollow cylinder section 40 when the container is completly filled and as the stop for the throttling plate 24 when the container is empty.

The throttling flap 24 is located to the front of the added wall 39, with which is formed a run-in channel 36 that leads into the hollow cylinder section 40.

A gasket 41 is installed around the output conrol area so that the pressure detector 29 is flush with this gasket along the contour of its outer edge.

The advantage of this arrangement is, that if a blockage of the residual opening of the run-off opening 26 ocurs, fluid penetrates through the run-in channel 36 into the hollow chamber 43 in front of the pressure detector 29, which the fluid affects, thus changing the equilibrium factors, and the throttling flap 24 opens again by itself, which causes automatic removal of the blockage.

Drawings 1 and 2 illustrate another possible design of the invention.

The throttling chamber 21 of this design of the regulating device, labelled 1, shows a run-off area 2 that is designed as a pipe junction that is attached at a base plate 4 in front of the corresponding opening 2'. A rocking shaft 5 is seated so as to pivot at the base plate 4. The rocking shaft 5 bears the throttling plate 3 at one end and has an arm 7 with a counterweight 8 at the other. The counterweight 8 is fastened on arm 7 so as to be functionally adjustable along its length.

The pressure detector 9, which lies in a perpendicular plane to the plane of the throttling plate 3, is rigidly fastened to the rocking shaft 5. The pressure detector 9 lies in an output control area 10, which is formed by walls 11 and 12, as well as by the wall parts provided by the base plate 4. The wall 11 has a contour designed to correspond to the arch of the area traversed by the pressure detector 9, while the wall 12 runs parallel to the parts forming a wall by the base plate 4. The output control area 10 formed by the walls and/or wall parts, mentioned above, is open at one end, labelled 13, towards the outer atmosphere, while the end, labelled 14, of the output control area 10 is open to the interior of a container, labelled 15, for example, of a rain water retention basin. Adjoining on the end 14 of the output control area 10 faced to the container 15 is an out-take section 16 located in the base plate 4. The out-take section 16 is bordered by edges 17, 18 and 19. When the pressure detector 9 and/or the throttling plate 3 is in final position, the edge 17 extends almost parallel to the plane of the pressure detector 9, and, in any case, such that the part of output control area 10 that faces away from the interior of the container 15 is practically sealed off from the pressure detector 9 opposite to the container 15.

Figure 2:
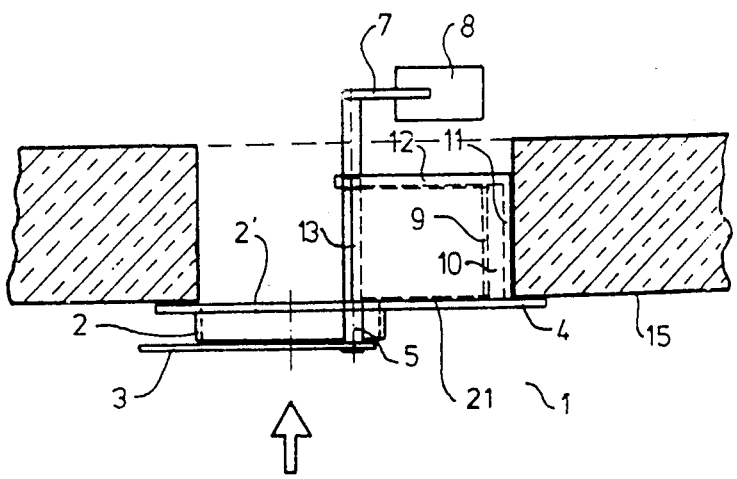
FIG. 2 is a top plan view of the device in FIG. 1.

The functioning of the regulating device in FIGS. 1 and 2 is described below:

As the water level in the container 15 rises, a definite pressure is exerted—corresponding to the given water level—upon the pressure detector 9 of the regulating device 1 by the water and/or fluid involved. This interior pressure, which more or less prevails over the exterior atmospheric pressure, will cause a movement, namely, a pivoting of the pressure detector 9 in a direction toward the end 13 of the output control area 10 facing towards the atmosphere. The throttle plate 3 follows with a pivoting movement of the pressure detector 9, so that with a rising water level the throttling plate more or less closes the run-off opening 2'. In this, the relocation and/or pivoting of pressure detector 9 always results in response to the level of fluid to such a degree that the forces working against each other—the force of the water in the container 15 on the one side, and on the other the force of the counterweight 8 on the rocking shaft 5--arrive at an equilibrium. Fundamentally, the arrangement is such that there is a sinusoidal increase in the working of the counterweight 8 over against the rising water level. In any case, it is also possible to allow the counterweight or parts of the counterweight to function only in a step-by-step application over the range of the total potential pivot motion and/or to use additional compensating units for creating needed opposing force, for example, mechanical or hydro-pneumatic springs with the required characteristics.

I claim:

1. A regulating device for controlling the flow of a fluid from a container through an outlet opening provided in the container, the regulating device comprising a throttling unit which is seated to pivot on an axis and can close in a manner that regulates the cross-sectional area of closure of the outlet opening;

counterweight means situated outside of the container for normally retaining the throttling unit in an inactive position away from the outlet opening to maximize the cross-sectional area of the outlet opening, the counterweight means acting to pivot the throttling unit in a first direction toward its inactive position, and hydrostatic pressure detector means connected to the counterweight means for pivoting the throttling unit in an opposite second direction to a throttling position at least partially closing the outlet opening in response to an increase in head pressure of fluid in the container in excess of a predetermined threshold level so that the cross-sectional area of the outlet opening is functionally related to head pressure of fluid in the container.

2. A regulating device for controlling the flow of a fluid from a container through an inlet opening provided in the container, the regulating device comprising a throttling unit which is seated to pivot on an axis and can close in a manner that regulates the cross-sectional area of closure of the outlet opening, counterweight means for normally retaining the throttling unit in an inactive position away from the outlet opening to maximize the cross-sectional area of the outlet opening, the counterweight means acting to pivot the throttling unit in a first direction toward its inactive position, pressure detector means connected to the counterweight means for pivoting the throttling unit in an opposite second direction to a throttling position at least partially closing the outlet opening in response to an increase in head pressure of fluid in the container in excess of a predetermined threshold level so that the cross-sectional area of the outlet opening is functionally related to head pressure of fluid in the container, and chamber means for housing the pressure detector means, the chamber means being in fluid communication with the container and situated in a location remote from the outlet opening so that fluid in the container is continuously admitted into the chamber means to expose the pressure detector means to a head pressure corresponding to the head pressure in the container.

3. The regulating device of claim 2, wherein the chamber means is formed to include a first opening in communication with the container and a second opening in communication with the atmosphere, and the pressure detector means includes partition means for dividing the chamber means into a fluid-containing zone communicating with the first opening and an air-containing zone communicating with the second opening, mounting means for pivotally mounting the partition means within the chamber means to permit the partition means to pivot in response to a change in the head pressure in the fluid-containing zone, and seal means on the partition means for sealingly engaging the chamber means to prevent fluid admitted into the fluid-containing zone through the first opening from exiting the chamber means through the second opening.

4. The regulating device of claim 2, wherein the counterweight means includes a shaft rotatably mounted to the container, the shaft extending through a wall of the container and having one end connected to the throttling unit and another end positioned outside of the container, and a weighted member fixed to said another end of the shaft, the weighted member acting to rotate the shaft in the first direction, thereby pivoting the throttling unit away from a throttling position toward its inactive position.

5. The regulating device of claim 4, wherein the chamber means is formed to include a first opening in communication with the container and a second opening in communication with the atmosphere, and the pressure detector means includes partition means for dividing the chamber means into a fluid-containing zone communicating with the first opening and an air-containing zone communicating with the second opening, mounting means for pivotally mounting the partition means within the chamber means to permit the partition means to pivot in the second direction in response to a change in the head pressure in the fluid-containing zone, and seal means on the partition means for sealingly engaging the chamber means to prevent fluid admitted into the fluid-containing zone through the first opening from exiting the chamber means through the second opening.

6. A regulating device for controlling the flow of a fluid from a container to the surroundings through an outlet opening provided in the container, the regulating device comprising throttle means for varying the cross-sectional area of the outlet opening to affect the flow of fluid from the container, chamber means in fluid communication with the container for holding fluid received from the container without discharging any fluid to the surroundings, the chamber means being situated in a position away from the outlet opening so that fluid in the container flows into the chamber means without flowing through the outlet opening, sensor means positioned in the chamber means for providing an indication of the head pressure of fluid in the container, the sensor means being movable in a first direction in response to an increase in head pressure in the chamber means and in an opposite second direction during a decrease in head pressure in the chamber means, and linkage means interconnecting the throttle means and the sensor means for actuating the throttle means in response to movement of the sensor means to regulate the flow of fluid through the outlet opening as the function of head pressure in the container.

7. The regulating device of claim 6, wherein the throttle means includes plate means movably mounted within the container for selectively covering portions of the outlet opening to vary the cross-sectional area of the outlet opening and the linkage means includes control means outside the container for moving the plate means to an outlet-opening position, thereby permitting maximum flow of fluid from the container through the outlet opening.

8. The regulating device of claim 7, wherein the control means includes a counterweight and a rotatable shaft interconnecting the counterweight and the plate means, the plate means normally moving to its outlet-opening position in response to rotation of the shaft induced by the counterweight, the mass of the counterweight being selected to retain the plate means in its outlet-opening position until the head pressure in the chamber means exceeds a predetermined threshold level detected by the sensor means.

9. The regulating device of claim 7, wherein the linkage means includes a rotatable shaft and the sensor means is fixed to the rotatable shaft to permit the sensor means to pivot about the longitudinal axis of the rotatable shaft as the sensor means moves within the chamber means.

10. The regulating device of claim 6, wherein the chamber means is formed to include a first opening in communication with the container and a second opening in communication with the atmosphere, and the sensor means includes head pressure detector means for dividing the chamber means into a fluid-containing zone communicating with the first opening and an air-containing zone communicating with the second opening, mounting means for pivotally mounting the head pressure detection means within the chamber means to permit the head pressure detection means to pivot in response to a change in the head pressure of the fluid-containing zone, and seal means on the head pressure detection means for sealingly engaging the chamber means to prevent fluid admitted into the fluid-containing zone through the first opening from exiting the chamber through the second opening.

11. A regulating device for controlling the flow of a fluid from a container through an outlet opening provided in a wall of the container, the regulating device comprising an output control chamber provided in the wall of the container, the wall being formed to include a separate chamber opening to establish a fluid passage interconnecting the output control chamber and the container in fluid communication, a throttling unit which is positioned outside of the output control chamber and seated to pivot on an axis and close in a manner that regulates the effective diameter of closure of the outlet opening, and a hydrostatic pressure detector in the output control chamber, the hydrostatic pressure detector being operatively connected to the throttling unit, the hydrostatic pressure detector, in dependence upon fluid head pressure in the output control chamber, governing the throttling unit in its closure of the outlet opening.

12. The regulating device of claim 11, wherein the throttling unit is rigidly joined with the pressure detector.

13. The regulating device of claim 11, wherein the pressure detector is weighted with a movable counterweight.

14. A regulating device for controlling the flow of a fluid from a container through an outlet opening provided in a wall of the container, the regulating device comprising an output control chamber provided in the wall of the container, the wall being formed to include a separate chamber opening to establish a fluid passage interconnecting the output control chamber and the container in fluid communication, a throttling unit which is seated to pivot on an axis and closes in a manner that regulates the effective diameter of closure of the outlet opening, and a pressure detector in the output control chamber, the pressure detector being operatively connected to the throttling unit, the pressure detector, in dependence upon fluid head pressure in the output control chamber, governing the throttling unit in its closure of the outlet opening, wherein the output control chamber is defined by an interior surface and the pressure detector is joined with the throttling unit at such an angle that, in every position of the throttling unit, the pressure detector maintains with its outer contour a seal along said inner surface of the output control chamber.

15. A regulating device for controlling the flow of a fluid from a container through an outlet opening provided in a wall of the container, the regulating device comprising an output control chamber provided in the wall of the container, the wall being formed to include a separate chamber opening to establish a fluid passage interconnecting the output control chamber and the container in fluid communication, a throttling unit which is seated to pivot on an axis and close in a manner that regulates the effective diameter of closure of the outlet opening, and a pressure detector in the output control chamber, the pressure detector being operatively connected to the throttling unit, the pressure detector, in dependence upon fluid head pressure in the output control chamber, governing the throttling unit in its closure of the outlet opening, wherein the pressure detector is fastened to a rocking shaft that extends parallel to a run-off direction through the outlet opening, while a throttling plate, the governed movement of which by degrees closes off the diamter of the outlet opening, is fastened at an end of the rocking shaft.

* * * * *

UNITED STATES PATENT AND TRADEMARK OFFICE
CERTIFICATE OF CORRECTION

PATENT NO. : 4,694,854

DATED : September 22, 1987

INVENTOR(S) : Giehl

It is certified that error appears in the above-identified patent and that said Letters Patent is hereby corrected as shown below:

In Col. 5, claim 2, line 64, delete "inlet" and insert
--outlet--.

In Col. 7, claim 10, line 54, delete "detector" and insert
--detection--.

Signed and Sealed this

Eighth Day of March, 1988

Attest:

DONALD J. QUIGG

Attesting Officer         Commissioner of Patents and Trademarks